Jan. 4, 1955    L. H. SOMMER    2,698,860
TRIORGANOSILYLCYCLOHEXENEONES
Filed Aug. 14, 1953
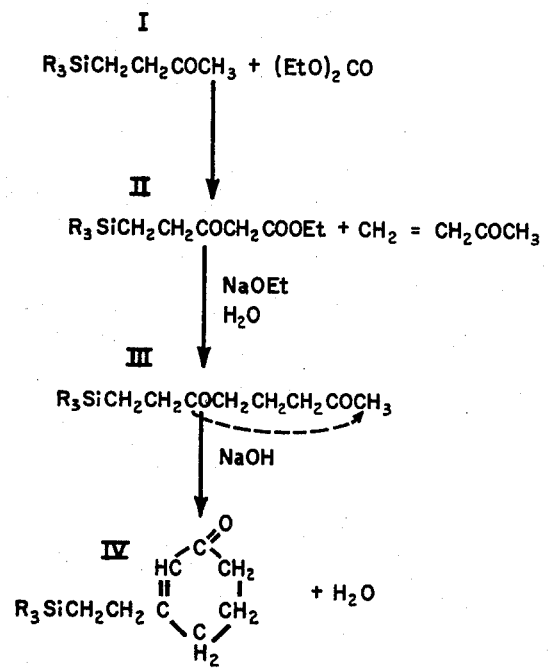
INVENTOR.
LEO H. SOMMER
BY Robert F. Fleming Jr.
ATTORNEY

United States Patent Office

2,698,860
Patented Jan. 4, 1955

2,698,860

TRIORGANOSILYLCYCLOHEXENEONES

Leo H. Sommer, State College, Pa., assignor to Dow Corning Corporation, Midland, Mich., a corporation of Michigan Application August 14, 1953, Serial No. 374,265

2 Claims. (Cl. 260—448.2)

It is the object of this invention to prepare novel compositions of matter which are useful in the formulation of perfumes.

This invention relates to compounds of the formula

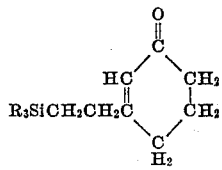

where R is a saturated aliphatic hydrocarbon radical or a monocyclic aryl hydrocarbon radical.

The preparation of these compounds is outlined in the drawing. In brief, the synthesis comprises reacting 4-triorganosilylbutane-2-ones (I), with ethyl carbonate to give ethyl-delta-triorganosilyl-beta-ketovalerates (II), which are then condensed with vinylmethylketone in the presence of sodium ethylate and the product thereafter hydrolyzed to give 1-triorganosilyloctane-3,7-diones (III), which are then cyclicized by condensing them with sodium hydroxide to give the desired 3-(2-triorganosilylethyl)-cyclohex-2-ene-1-ones (IV).

Compounds of the type I are prepared by reacting silanes of the formula R₃SiCH₂Cl with sodium and an excess of acetoacetic ester in an ethanol solution and thereafter hydrolyzing the product with concentrated hydrochloric acid. This process is fully described in U. S. Patent 2,635,108.

For the purpose of this invention R can be any saturated aliphatic hydrocarbon radical such as methyl, ethyl, octadecyl, cyclohexyl or cyclopentyl and any monocyclic aryl hydrocarbon radical such as phenyl, tolyl, or xylyl. It is to be understood that all of the R groups on a silicon atom can be alike or the various R groups can be different radicals. Thus, for example, the triorganosilyl groups can be trimethylsilyl, methyldipropylsilyl, or octadecylphenyltolylsilyl.

The following example is illustrative only and should not be construed as limiting the invention which is properly delineated in the appended claims.

Example 250 ml. of dry ethyl ether and 48 g. of sodium hydride were placed in a flask and the system was swept with dry nitrogen. 259 g. of ethyl carbonate were added rapidly. The ether was brought to reflux and 144 g. of 4-trimethylsilylbutane-3-one (Me₃SiCH₂CH₂COCH₃) in 400 ml. of dry ethyl ether were added with stirring over a period of 10 hours. The reaction mixture was refluxed overnight. 125 ml. of glacial acetic acid and 400 ml. of water were added to the reaction mixture. The organic layer was separated and washed with water and with 10 percent sodium bicarbonate solution and finally dried over anhydrous sodium sulfate. Upon distillation, the compound ethyl delta - trimethylsilyl - beta - ketovalerate (Me₃SiCH₂CH₂COCH₂COOEt) was obtained.

64.8 g. of this ketovalerate in 200 ml. of anhydrous ether were added rapidly to a solution of 3.4 g. of sodium ethoxide in absolute ethanol. A solution of 23.1 g. of freshly distilled vinylmethylketone in 500 ml. of anhydrous ether were then added with stirring over a period of 1½ hours at room temperature. The reaction mixture was stirred an additional 1½ hours and a solution of 10 ml. of glacial acetic acid in 100 ml. of water was added. The ether layer was separated, washed with water, and dried over anhydrous sodium sulfate. Upon distillation the compound 1-trimethylsilyloctane-3,7-dione (Me₃SiCH₂CH₂COCH₂CH₂CH₂COCH₃)

was obtained. The product was recrystallized from hexane to give shining white plates melting from 49.5 to 50° C. and having a pleasant odor. Upon analysis the material is found to contain 13.2 percent by weight silicon.

A solution of 2.14 g. of this dione in 25 ml. of an alcoholic potassium hydroxide solution (5% by weight KOH) was refluxed for one hour. The solution was cooled and extracted 3 times with ether. The combined ether layers were washed with water and dried over anhydrous sodium sulfate. Upon distillation there was obtained the compound 3-(2-trimethylsilylethyl)cyclohex-2-ene-1-one,

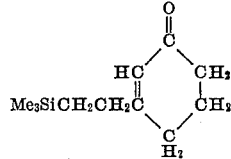

boiling at 123–126° C. at 6 mm. and having a refractive index at 20° C. of 1.4888. The material was analyzed and found to contain 14.6 percent by weight silicon. The ultraviolet absorption spectrum of this compound in alcohol solution showed a maximum at 238 mμ, log ε 4.13.

That which is claimed is:

1. A composition of matter having the formula

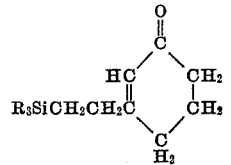

in which R is selected from the group consisting of saturated aliphatic hydrocarbon radicals and monocyclicaryl hydrocarbon radicals.

2. 3 - (2 - trimethylsilylethyl)cyclohex - 2 - ene - 1 - one.

No references cited.